(12) United States Patent  
Schüler et al.

(10) Patent No.: US 7,306,285 B2
(45) Date of Patent: Dec. 11, 2007

(54) ADJUSTER FOR A VEHICLE SEAT

(75) Inventors: Rolf Schüler, Heiligenhaus (DE); Ulrich Lehmann, Alfter-Bonn (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 11/354,317

(22) Filed: Feb. 14, 2006

(65) Prior Publication Data

US 2006/0124820 A1 Jun. 15, 2006

Related U.S. Application Data

(63) Continuation of application No. PCT/EP2004/009524, filed on Aug. 26, 2004.

(30) Foreign Application Priority Data

Sep. 5, 2003 (DE) ................................ 103 41 001

(51) Int. Cl.
*B60N 2/02* (2006.01)

(52) U.S. Cl. ............... 297/344.17; 297/330; 74/437
(58) Field of Classification Search ............... 297/330, 297/344.17, 362, 362.11, 362.12; 74/437
See application file for complete search history.

(56) References Cited

U.S. PATENT DOCUMENTS

| 263,791 | A | * | 9/1882 | Leclere ........................ 74/437 |
|---|---|---|---|---|
| 3,823,617 | A | | 7/1974 | Infanger et al. |
| 3,992,960 | A | * | 11/1976 | Rulseh ........................ 74/393 |
| 4,121,802 | A | | 10/1978 | Kluting et al. |
| 4,128,225 | A | | 12/1978 | Klüting et al. |
| 4,387,874 | A | * | 6/1983 | Boisset ........................ 248/396 |
| 4,470,318 | A | * | 9/1984 | Cremer et al. ................ 74/353 |
| 4,685,348 | A | * | 8/1987 | Takami ........................ 74/437 |
| 4,744,125 | A | | 5/1988 | Scheck et al. |
| 4,763,385 | A | | 8/1988 | Furch et al. |
| 5,199,393 | A | | 4/1993 | Baldassini |
| 6,158,811 | A | * | 12/2000 | Hofschulte et al. ......... 297/362 |
| 6,220,115 | B1 | | 4/2001 | Hirn et al. |
| 6,264,275 | B1 | | 7/2001 | Frohnhaus et al. |
| 6,338,693 | B1 | * | 1/2002 | Scholten et al. ................ 477/7 |
| 6,761,083 | B1 | | 7/2004 | Grill |
| 7,008,017 | B1 | * | 3/2006 | Wegener ..................... 297/330 |

FOREIGN PATENT DOCUMENTS

| DE | 1 755 424 | 8/1971 |
|---|---|---|
| DE | 26 26 442 A1 | 12/1977 |
| DE | 36 45 315 C2 | 2/1998 |
| EP | 0 979 749 B1 | 2/2000 |
| WO | WO 01/06148 | 1/2001 |

* cited by examiner

*Primary Examiner*—Joe Edell
(74) *Attorney, Agent, or Firm*—Womble Carlyle Sandridge & Rice, PLLC

(57) ABSTRACT

In the case of an adjuster (3) for a vehicle seat, in particular for a motor vehicle seat, with a drivable geared fitting, the driven geared fitting moving a component of the adjuster (3) and/or of the vehicle seat (1), a gear stage (21) with a fluctuating transmission ratio is connected upstream of the geared fitting.

13 Claims, 2 Drawing Sheets

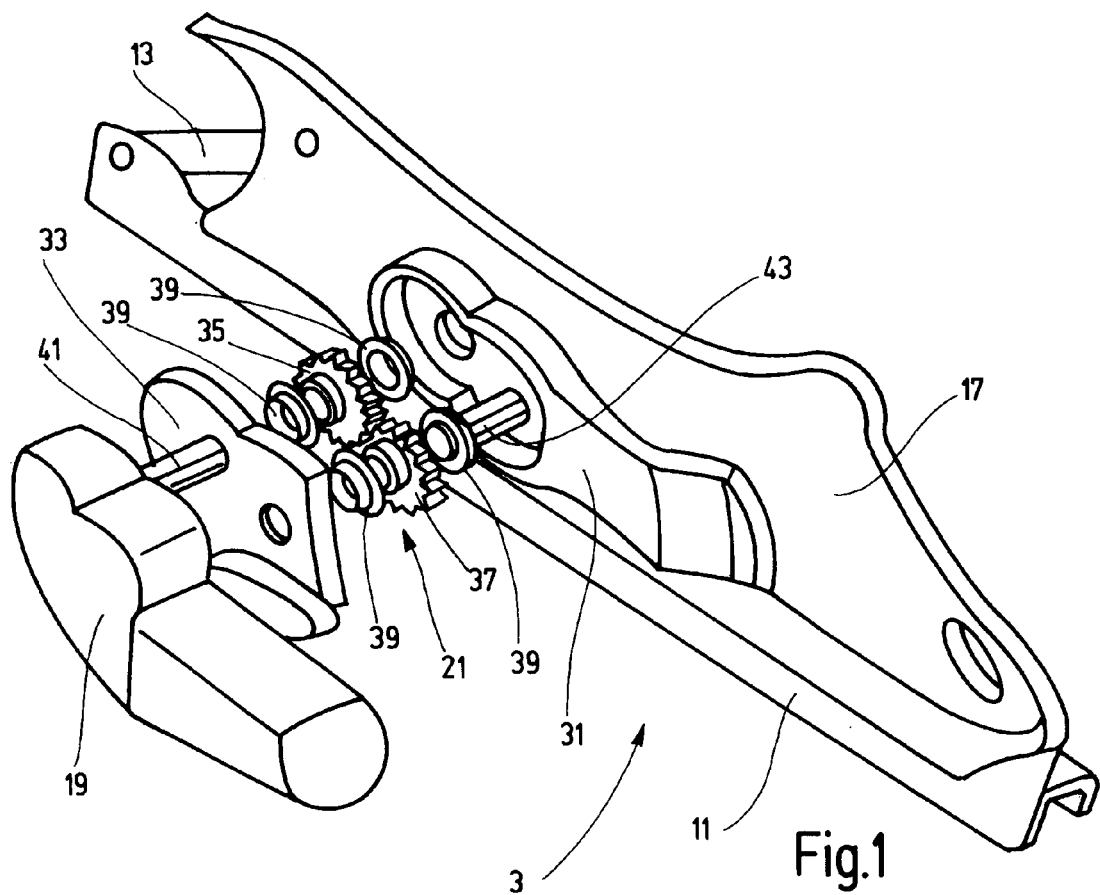
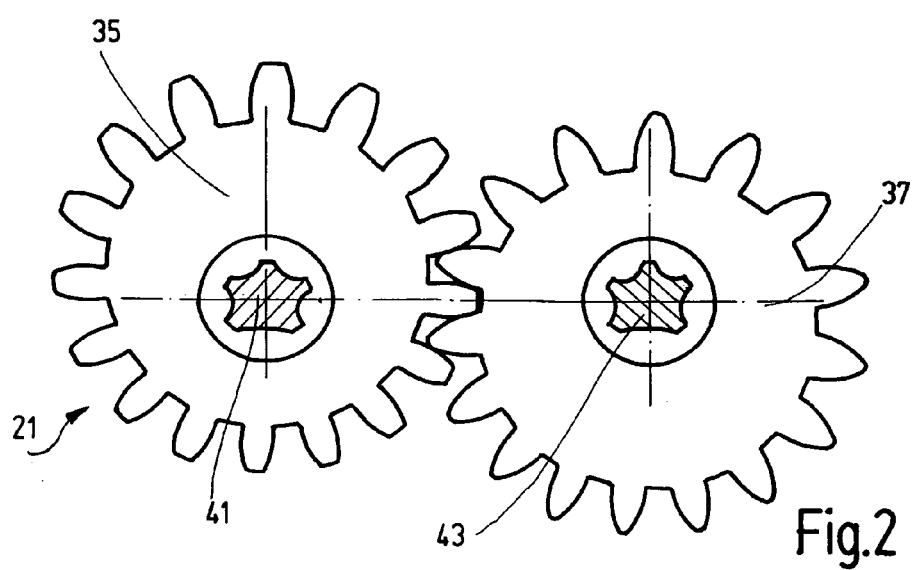

ADJUSTER FOR A VEHICLE SEAT

CROSS-REFERENCE TO RELATED APPLICATION

The present application is a continuation of PCT/EP2004/009524, which was filed Aug. 26, 2004. The entire disclosure of PCT/EP2004/009524 is incorporated herein by reference.

BACKGROUND OF THE INVENTION

The present invention relates to an adjuster for a vehicle seat, in particular for a motor vehicle seat, with a drivable geared fitting that is for moving a component of the adjuster and/or of the vehicle seat.

In a known vehicle seat with a height adjuster, the height is adjusted by movement of pivotable supports. In this known vehicle seat, the geared fitting of the height adjuster is based on an eccentric principle which is why, in combination with the pivotable supports, the torque requirement of the entire system fluctuates periodically with the rotation of the eccentric. In order to prevent corresponding fluctuations of the motor speed that result in disturbing noises, it is conventional to use a high-torque, heavy-duty motor so that the speed of the motor is only imperceptibly influenced.

BRIEF SUMMARY OF SOME ASPECTS OF THE INVENTION

An aspect of the present invention is the provision of improvements to an adjuster for a vehicle seat, in particular for a motor vehicle seat, with a drivable geared fitting that is for moving a component of the adjuster and/or of the vehicle seat.

In accordance with one aspect of the present invention, an adjuster for a vehicle seat, in particular for a motor vehicle seat, includes a gear stage operatively associated with a geared fitting so that the geared fitting is driven in response to the gear stage being driven, and the geared fitting is operatively associated with a component for moving the component in response to the geared fitting being driven, whereby the geared fitting is operatively between the gear stage and the component. The component is selected from the group consisting of a component of the adjuster, a component of the vehicle seat, and a component that is part of both the adjuster and the vehicle seat. The gear stage has a fluctuating transmission ratio.

Because the gear stage with its fluctuating transmission ratio is connected upstream of the geared fitting, the fluctuating torque requirement of the system comprising the geared fitting (which is designed as an eccentric gear in an exemplary embodiment of the present invention) and, if appropriate, levers and pivotable supports of the adjuster, can be at least virtually compensated for, i.e. the driving of the gear stage can take place uniformly, in particular at a uniform speed. In the case of a preferred motorized drive, use can then be made of a motor which is lower-powered in comparison to the prior art and is more favorable in terms of cost and weight. In the case of step-by-step mechanisms, noticeable and disturbing fluctuations in power are avoided. Overall, the comfort is increased by the solution according to the present invention.

The gear stage is preferably designed as an eccentric gear, i.e. at least one gearwheel, generally, for geometrical reasons, two gearwheels, rotates or rotate in each case about a pivot point deviating from the center point of curvature of their toothing. These gearwheels are configured for a plurality of full revolutions, which is made possible, for example, by an at least approximately circular shape, for example at the addendum circle. Although DE 26 26 442 C2 discloses a height adjuster which has two elliptical toothed segments, due to the low transmission ratio with only partial revolutions of the toothed segments, very high operating forces have to be applied and these can expediently only be controlled by the use of the geared fitting provided in accordance with the invention, in particular in the case of a motorized drive.

In contrast to conventional gearwheels, in the case of the gearwheels provided in the gear stage, the mutually corresponding points or regions of the individual teeth, for example the centers of the tooth tips, are generally not situated precisely and, only in special cases, are situated on a common circle. Rather, the shape of the connecting line is determined from the distances belonging to the particular angle from the pivot point of the gearwheel, the magnitude of which distances is derived in turn from the transmission desired at the particular angle. These gearwheels are mounted directly or indirectly in their pivot point, which is offset with respect to the center of gravity of the area, by, for example, fitting in a rotationally fixed manner in each case on a mounted shaft which then defines the particular axis of rotation. In order to save on construction space, one shaft stub is sufficient, with longer shafts also being possible. These gearwheels have a working circle with a sinusoidal profile which is matched to the torque fluctuations. The individual tooth geometry changes continuously with the circumference; in particular, the values for profile displacement, root and tip height, transition radii, etc. change. One gearwheel is preferably driven by the motor, while the other gearwheel preferably drives the geared fitting. The transmission ratio changes periodically by the value 1:1.

For pre-assembly, which is helpful in particular because of the ambiguous alignment which is capable of functioning only in one position, the gear stage preferably has an at least substantially closed housing within which the gearwheels are arranged and securely mounted. The gear stage may be integrated in the motor, for example may be arranged in the same housing as the motor's transmission that is typically present.

One particularly advantageous use of the adjuster according to the present invention is for height adjusters or inclination adjusters in which the seat cushion is moved, since high forces are necessary for this. However, it is also possible to provide the adjuster as an inclination adjuster for the seat back. Correspondingly, each vehicle seat may in principle be equipped with an adjuster according to the present invention which then, when actuated, ultimately moves one component or an entire subassembly of the vehicle seat.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 shows a perspective, exploded illustration of part of the exemplary embodiment, FIG. 2 shows a view of the two gearwheels.

DETAILED DESCRIPTION OF EXEMPLARY EMBODIMENT

Figure 4:
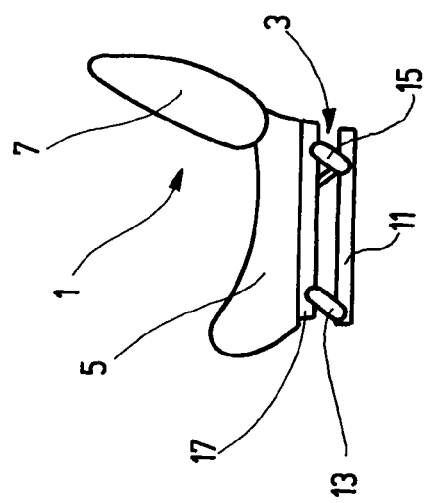
FIG. 4 shows a schematic view of a vehicle seat.
Figure 3:
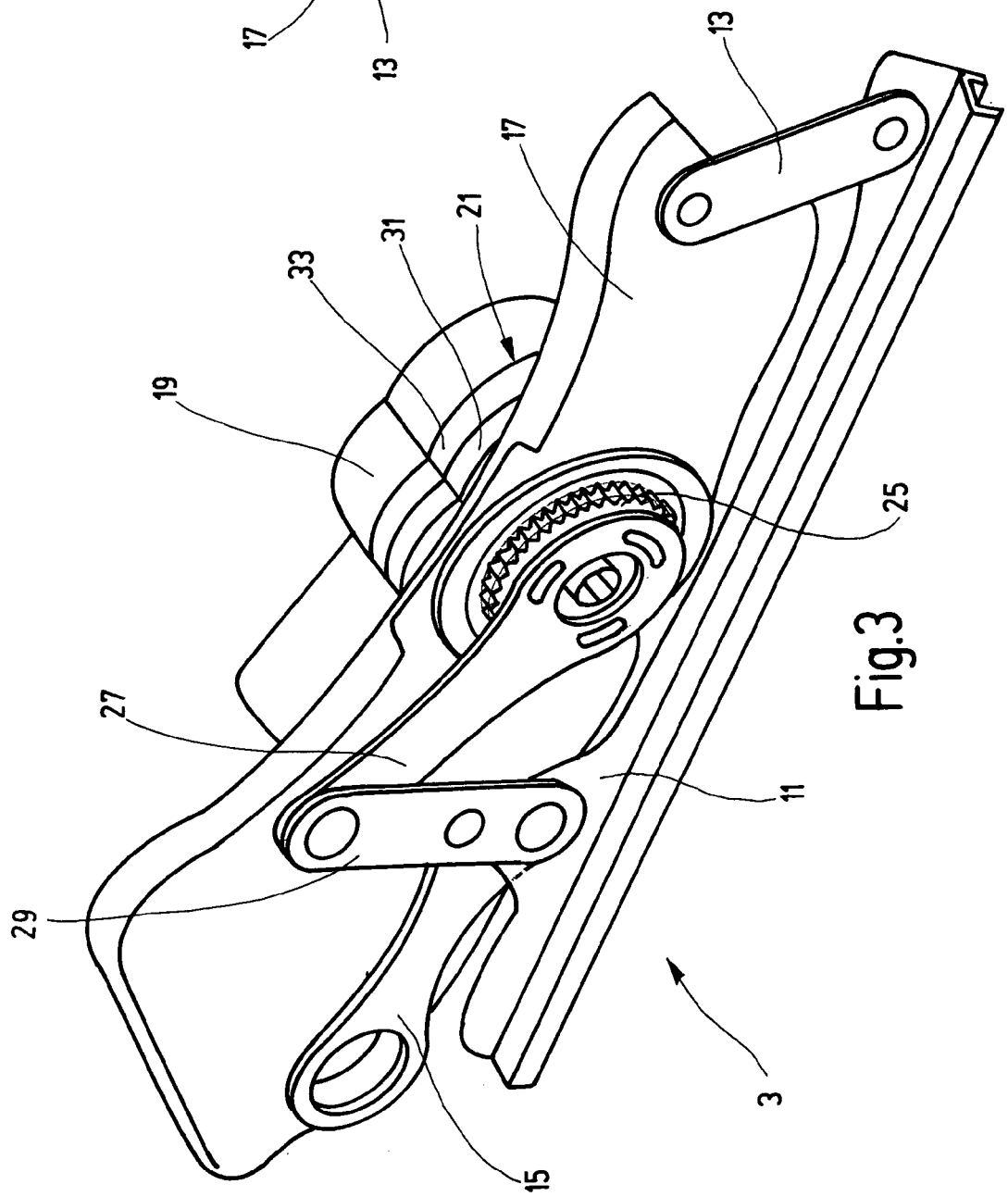
FIG. 3 shows a perspective view of part of the exemplary embodiment from the viewing direction opposite to that of FIG. 1.

A vehicle seat 1 for a motor vehicle has an adjuster 3 which is designed as a height adjuster and by way of which the seat cushion 5 together with the seat back 7 can be adjusted in height relative to the floor of the motor vehicle. For this, on both sides of the vehicle seat a front pivotable support 13 and a rear pivotable support 15 are coupled by one end in each case to seat rails 11 and are coupled by their other end in each case to a side part 17 of the seat frame, so that a four-bar linkage is defined. A motor 19 fitted to the side part 17 of the seat frame drives, by way of a gear stage 21 described in more detail below, a geared fitting 25. The rear pivotable support 15 is a component of both the adjuster 3 and the vehicle seat 1. The geared fitting 25 is placed in the side part 17 of the seat frame and acts by way of a driving lever 27 on an arm 29 of the rear pivotable support 15, and pivots the rear pivotable support 15, as a result of which the adjuster 3 is actuated.

The self-locking geared fitting 25 is known per se. The self-locking geared fitting 25 has, in its interior, a rotating eccentric which ensures a rolling-contact movement between an end gearwheel and an internal toothed ring which are respectively provided on first and second parts of the fitting 25. A full rotation of the eccentric causes a relative rotation between the first and second parts of the fitting by a few angular degrees. Because of the rotation of the eccentric within the geared fitting 25, the lever arms and supporting points change relative to the driving lever 27, so that a fluctuating torque requirement arises.

The gear stage 21 provided between the motor 19 and the geared fitting 21 comprises a first housing part 31, which is to be attached to the side part 17 of the seat frame, and a second housing part 33, which is to be connected to the first housing part 31 to form an at least substantially closed housing, between which housing parts a first gearwheel 35 and a second gearwheel 37 are arranged. The first gearwheel 35 and the second gearwheel 37 are mounted rotatably in the two housing parts 31 and 33 by way of respective bearing bushings 39. A profiled drive shaft 41 is driven by the motor 19 and defines a first axis of rotation. The stub (e.g., end portion) of the profiled drive shaft 41 which defines the first axis of rotation, protrudes through the second housing part 33 and holds the first gearwheel 35 in a rotationally fixed manner. The first gearwheel 35 meshes with the second gearwheel 37 which sits in a rotationally fixed manner on the stub of a profiled output shaft 43 that defines a second axis of rotation. The profiled output shaft 43, which defines the second axis of rotation, protrudes through the first housing part 31 and drives the geared fitting 25.

The drive shaft 41 defining the first axis of rotation and the output shaft 43 defining the second axis of rotation penetrate the first gearwheel 35 and the second gearwheel 37, respectively, at points which, in contrast to conventional gearwheels, are not situated in the center point of a circle and therefore not in the center of gravity of the area of the toothing geometry, i.e. the gearwheels are eccentric with regard to their pivot point. Whereas the first axis of rotation, which is defined by the drive shaft 41 and about which the first gearwheel 35 rotates, and the second axis of rotation, which is defined by the output shaft 43 and about which the second gearwheel 37 rotates, remain in a fixed position, the distance of the contact point of the two gearwheels 35 and 37 changes continuously during a revolution, thus producing a similarly continuous change in the transmission ratio. Each individual tooth of the two gearwheels 35 and 37 is adapted individually in its geometry, i.e. height, width, inclination, flank angle, radii, etc., in such a manner that, in spite of the offset, the two gearwheels 35 and 37 roll uniformly along each other. The gear stage 21 therefore forms an eccentric gear.

Quite a few revolutions of the gearwheels 35 and 37 of the gear stage 21 are envisaged during operation. The fluctuating transmission ratio of the gear stage 21 can compensate for the fluctuating torque requirement of the system, which comprises the geared fitting 25, driving lever 29 and rear pivotable support 15, in such a manner that the motor 19, which is designed as a simple DC motor, can supply a virtually constant torque, i.e. no significant fluctuations in the motor speed occur that would cause disturbing noises.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. An adjuster for a vehicle seat, the adjuster comprising:
   a gear stage operatively associated with a geared fitting so that the geared fitting is driven in response to the gear stage being driven, and the geared fitting is operatively associated with a component for moving the component in response to the geared fitting being driven, whereby the geared fitting is operative between the gear stage and the component, and wherein
   the component is selected from the group consisting of a component of the adjuster, a component of the vehicle seat, and a component that is part of both the adjuster and the vehicle seat,
   the gear stage comprises an eccentric gear that has a fluctuating transmission ratio,
   the eccentric gear comprises a plurality of gearwheels that are configured for rotating through a plurality of full revolutions,
   the plurality of gearwheels includes a first gearwheel mounted for being rotated about a first axis of rotation,
   the first gearwheel's toothing geometry area has a center of gravity that is positioned offset with respect to the first axis of rotation, whereby the first gearwheel is eccentric,
   the geared fitting is adapted for being driven by a drive shaft mounted for being rotated about a second axis of rotation,
   the plurality of gearwheels includes a second gearwheel mounted on the drive shaft for rotating with the drive shaft about the second axis of rotation,
   the second gearwheel's toothing geometry area has a center of gravity that is positioned offset with respect to the second axis of rotation, whereby the second gearwheel is eccentric,
   the geared fitting is self-locking and has a fluctuating torque requirement, and
   the fluctuating transmission ratio of the eccentric gear is adapted to at least partially compensate for the fluctuating torque requirement of the geared fitting.

2. The adjuster as claimed in claim 1, further comprising a motor operatively associated with the gear stage for driving the gear stage, whereby the geared fitting is indirectly driven by the motor.

3. The adjuster as claimed in claim 2, wherein the gear stage is integrated in the motor.

4. The adjuster as claimed in claim 2, wherein the first gearwheel is meshed with the second gearwheel.

5. The adjuster according to claim 2 in combination with at least a seat cushion of the vehicle seat and further in combination with at least one pivotable support of the vehicle seat, wherein:
the pivotable support is adapted for at least partially supporting the seat cushion,
the adjuster is a height adjuster for adjusting at least the seat cushion's height,
the height adjuster comprises the pivotable support, and
the component, which the geared fitting is operatively associated with for moving the component in response to the geared fitting being driven, comprises the pivotable support.

6. The adjuster as claimed in claim 2, wherein:
the drive shaft is a second drive shaft,
the motor is adapted for rotating a first drive shaft about the first axis of rotation, and
the first gearwheel is mounted on the first drive shaft for rotating with the first drive shaft about the first axis of rotation.

7. The adjuster as claimed in claim 6, wherein:
the first drive shaft comprises a portion that protrudes through a part of a housing, and
the first gearwheel being mounted on the first drive shaft comprises the first gearwheel being mounted on the portion of the first drive shaft.

8. The adjuster as claimed in claim 6, wherein the gear stage has an at least substantially closed housing within which the first and second gearwheels are arranged.

9. The adjuster as claimed in claim 1, wherein the gear stage has an at least substantially closed housing within which the first and second gearwheels are arranged.

10. The adjuster as claimed in claim 9, further comprising a motor operatively associated with the gear stage for driving the gear stage, whereby the geared fitting is indirectly driven by the motor.

11. The adjuster according to claim 1 in combination with at least a seat cushion of the vehicle seat and further in combination with at least one pivotable support of the vehicle seat, wherein:
the pivotable support is adapted for at least partially supporting the seat cushion,
the adjuster is a height adjuster for adjusting at least the seat cushion's height,
the height adjuster comprises the pivotable support, and
the component, which the geared fitting is operatively associated with for moving the component in response to the geared fitting being driven, comprises the pivotable support.

12. The adjuster according to claim 1 in combination with the vehicle seat, wherein the adjuster is adapted for adjusting at least a portion of the vehicle seat.

13. The adjuster as claimed in claim 1, wherein the first gearwheel is meshed with the second gearwheel.

* * * * *